United States Patent
Schepers et al.

(10) Patent No.: US 10,374,812 B2
(45) Date of Patent: Aug. 6, 2019

(54) DEVICE, SYSTEM AND METHOD FOR VERIFYING THE AUTHENTICITY INTEGRITY AND/OR PHYSICAL CONDITION OF AN ITEM

(75) Inventors: Hendrik Jan Jozef Hubertus Schepers, Eindhoven (NL); Boris Skoric, Eindhoven (NL)

(73) Assignee: KONINKLIJKE PHILIPS ELECTRONICS N.V., Eindhoven (NL)

( * ) Notice: Subject to any disclaimer, the term of this patent is extended or adjusted under 35 U.S.C. 154(b) by 452 days.

(21) Appl. No.: 12/997,893

(22) PCT Filed: Jun. 17, 2009

(86) PCT No.: PCT/IB2009/052574
§ 371 (c)(1),
(2), (4) Date: Dec. 14, 2010

(87) PCT Pub. No.: WO2009/156904
PCT Pub. Date: Dec. 30, 2009

(65) Prior Publication Data
US 2011/0099117 A1    Apr. 28, 2011

(30) Foreign Application Priority Data
Jun. 27, 2008    (EP) .................... 08159154

(51) Int. Cl.
*H04L 9/32*    (2006.01)
*G06F 21/30*    (2013.01)
(Continued)

(52) U.S. Cl.
CPC .......... *H04L 9/3278* (2013.01); *G06F 21/305* (2013.01); *G06F 21/35* (2013.01);
(Continued)

(58) Field of Classification Search
None
See application file for complete search history.

(56) References Cited

U.S. PATENT DOCUMENTS 6,501,390 B1 * 12/2002 Chainer et al. .......... 340/870.16
7,005,733 B2    2/2006 Kommerling et al.
(Continued)

FOREIGN PATENT DOCUMENTS

EP    1020813 A2    7/2000
WO    2004104899 A2    12/2004
(Continued)

OTHER PUBLICATIONS

Ravikanth et al: "Physical One-Way Functions"; Ph.D. Thesis, Massachusetts Institute of Technology, 2001, 155 Page Document.
(Continued)

*Primary Examiner* — Jan P Mincarelli

(57) ABSTRACT

A physical uncloneable function (PUF) pattern is used for verifying a physical condition of an item. The PUF pattern is arranged to be damaged in the event that said item is exposed to a predetermined environmental condition. Verification of the physical condition of the item, is carried out by obtaining a measured response from the PUF pattern, and comparing the measured response with a stored response in respect of the PUF.

14 Claims, 5 Drawing Sheets

(51) Int. Cl.
*G06F 21/35* (2013.01)
*G06F 21/74* (2013.01)
*G06Q 30/00* (2012.01)

(52) U.S. Cl.
CPC ......... *G06F 21/74* (2013.01); *G06Q 30/0185* (2013.01); *H04L 9/3218* (2013.01); *G06F 2221/2105* (2013.01); *G06F 2221/2121* (2013.01); *G06F 2221/2129* (2013.01); *H04L 2209/805* (2013.01)

(56) References Cited

U.S. PATENT DOCUMENTS

| | | | | |
|---|---|---|---|---|
| 2003/0204743 | A1* | 10/2003 | Devadas et al. | 713/200 |
| 2007/0044139 | A1* | 2/2007 | Tuyls et al. | 726/2 |
| 2009/0265758 | A1 | 10/2009 | Tuyls | |
| 2010/0176920 | A1* | 7/2010 | Kursawe et al. | 340/5.74 |

FOREIGN PATENT DOCUMENTS

| | | |
|---|---|---|
| WO | 2007031908 A2 | 3/2007 |
| WO | 2007116355 A2 | 10/2007 |

OTHER PUBLICATIONS

Ranasinghe et al: "Security and Privacy Solutions for Low-Cost RFID Systems"; ISSNIP, IEEE 2004, pp. 337-342.
Suh et al: "Design and Implementation of the Aegis Single-Chip Secure Processor Using Physical Random Functions"; Proceedings of the 32nd International Symposium on Computer Architecture (SCA '05), 2005 IEEE, 12 Page Document.
Gassend et al: "Silicon Physical Random Functions"; CCS'02, Nov. 2002, 13 Page Document.
Gassend, B.:"Physical Random Functions"; Thesis At the Massachussets Institute of Technology, Feb. 2003, 89 Page Document.
Bolotnyy et al: "Physically Unclonable Function-Bsed Security and Privacy in RFID Systems"; Proceedings of the Fifth Annual IEEE International Conference on Pervasive Computing and Communications (PerCom'07), 8 Page Document.

\* cited by examiner

DEVICE, SYSTEM AND METHOD FOR VERIFYING THE AUTHENTICITY INTEGRITY AND/OR PHYSICAL CONDITION OF AN ITEM

FIELD OF THE INVENTION

This invention relates to physical uncloneable function (PUF) devices for verifying the authenticity, integrity and/or physical condition of an item, and a system and method for verifying the authenticity, integrity and/or physical condition of a physical item.

BACKGROUND OF THE INVENTION

Product piracy is a worldwide problem. It is estimated that over 5% of all world trade is in counterfeit goods, adding up to about $250 billion per year. Such product piracy affects both physical products, such as watches, spare parts and medicine, as well as non-physical products, such as music and computer software. However, in some cases, the non-physical products are wrapped in a physical package or stored on some sort of physical media, for example, music on a cd, whereby also non-physical products in some cases may be seen as physical products.

In order to overcome this piracy problem, a number of different technical solutions for checking the authenticity of a product have been developed. One such solution is, for example, a bar code system connected to a database, in which individual information in relation to relevant items is held. However, bar codes can easily be copied. Furthermore, holding information individually for a large number of items in a variety of countries requires a lot of administration in order to be updated. Therefore, other types of technical solutions, not requiring a central administration, have been developed.

A Physical Unclonable Function (PUF) is a function that is realized by a physical system, such that the function is easy to evaluate but the physical system is hard to characterize. Furthermore, the physical system is hard to clone physically. PUFs are for example described in R. Pappu, *Physical One-Way Functions*, Ph.D. thesis, MIT, 2001.

International Patent Application No. WO2007/031908 describes a physical uncloneable function (PUF) device for determining authenticity of an item, wherein a PUF pattern of the PUF device is damaged when using the item for the first time. The PUF pattern, giving rise to a cryptographic key, is damaged when using or opening the item. When the PUF pattern is damaged, the original cryptographic key is destroyed and can no longer be restored. Moreover, the damaged PUF pattern results in an unpredictable (random) new key that is inconsistent with the reference value used for authentication. Consequently, it is virtually impossible to fake authenticity for an item after the first usage.

Often, goods are shipped that are vulnerable to some environmental influence, for example, high/low temperature, high acceleration, exposure to light, chemicals, moisture, etc., or goods that simply degrade with time.

Special labels exist in the market that indicate if excessive conditions have occurred, for example, by irreversibly changing color. However, dishonest parties could replace an 'invalidated' label by a fresh one that does not indicate that a problem has occurred. Thus, the (re-)sale conditions for that item will appear to be met. The replacement could be a fake label or simply another authentic one available to a party legally within the supply chain. This problem can arise because the authentic labels cannot be mutually distinguished and are typically provided in bulk, for example on a roll.

SUMMARY OF THE INVENTION

It is, therefore, an object of the present invention to solve, or at least reduce, the problems discussed above. In particular, an objective is to achieve an improved device for verification of re-sale conditions in respect of physical products.

In accordance with the present invention, there is provided a physical uncloneable function (PUF), comprising a PUF pattern, for verifying a physical condition of an item, wherein said PUF pattern is arranged to be damaged in the event that said item is exposed to a predetermined environmental condition.

Beneficially, said PUF pattern is arranged to be damaged when using said item for the first time.

Preferably, said PUF pattern is formed in or on a label.

In one exemplary embodiment, the PUF pattern may be arranged to degrade over time.

The PUF pattern may be provided in or on a passive or active sensor. In this case, the sensor may comprise a radioactivity sensor, an accelerometer, shock or vibration sensor, a chemical or biochemical sensor, a moisture sensor, an electromagnetic field sensor, or a pressure sensor. It will be appreciated that this encompasses both passive and active sensors (for example, photosensitive film that reacts to radioactivity as well as Geiger counters, elements that break as well as electronic accelerometers, etc).

In another embodiment, said PUF pattern may be formed in or on a light, heat or moisture sensitive material.

Also, in accordance with the present invention, there is provided a system for verifying a physical condition of an item, wherein said item has a PUF as defined above provided therein or thereon, the system comprising means for obtaining a measured response from said PUF pattern, means for comparing said measured response with a stored response in respect of said PUF, and means for determining if said measured response is consistent with said stored response.

The system may further comprise means for verifying the authenticity of enrolment data stored in respect of said PUF during an enrolment phase.

Still further in accordance with the present invention, there is provided a method of enabling verification of a physical condition of an item, comprising providing a PUF as defined above, measuring a response thereof, forming enrollment data based on information derived from the measured response, and storing said enrollment data.

In this case, the method may further comprise signing said enrollment data prior to storage thereof.

An improvement to the above method could be applying a particular challenge multiple times in order to obtain more reliable detected first response data, e.g. by using a majority vote on individual bits over all detected first response data. Depending on the robustness of the sytem further improvements may be required. Delta contracting functions as described in international application WO 2004/104899, "Authentication of a physical object", hereby included by reference, can be used to compensate for such variations and can be used to obtain more reliable enrollment data.

WO2004/104899 describes in detail how to generate so-called helper data that can be used during authentication to improve reliability. The helper data and the measured response data are used as input to a delta-contracting function during authentication. The delta-contracting function capitalizes on the redundancy in the helper data to correct errors in the measured response data. The output of the delta-contracting function can be interpreted as a noise-compensated response that can be used in further processing.

Therefore, beneficially the step of forming said enrollment data comprises a sub-step of generating a first helper data for use in a delta contracting function during verification of a physical condition of an item.

These and other aspects of the present invention will be apparent from, and elucidated with reference to, the embodiments described herein.

BRIEF DESCRIPTION OF THE DRAWINGS

Embodiments of the present invention will now be described by way of examples only and with reference to the accompanying drawings, in which.

DETAILED DESCRIPTION OF THE EMBODIMENTS

Physical arrangements produced in an uncontrolled production process, that is a production process containing some sort of randomness, are suitable for being used as PUF arrangements.
Examples of such PUF arrangements are:

Optical PUF arrangement—a transparent medium containing disordered structures producing a speckle pattern when being illuminated by a laser beam.

Coating PUF arrangement—a coating on an integrated circuit containing random dielectric particles from which local capacitance values may be measured.

Acoustical PUF arrangement—a physical structure probed with acoustic waves.

Silicon PUF arrangement—an integrated circuit produced in silicon having differences in circuit delays due to manufacturing variations.

In all cases, the materials used to form the PUF arrangement can be selected so as to cause the PUF pattern to be damaged in the event that the item to which it is attached, or in which it is incorporated, is exposed to a predetermined environmental condition.

For example, if it is required to determine exposure to excessive temperature, two or more materials of different expansion coefficients can be used so as to cause breakage in the event of exposure to temperature extremes. If extreme temperature or pressure is to be determined, chemicals which react, mix or melt in the presence of such conditions could be used. If exposure to light is to be identified, the device could be formed with a light-sensitive material.

Because of the randomness in the manufacturing process, there is an extremely high probability that each individual arrangement will generate their own unique identifier.

Figure 1:
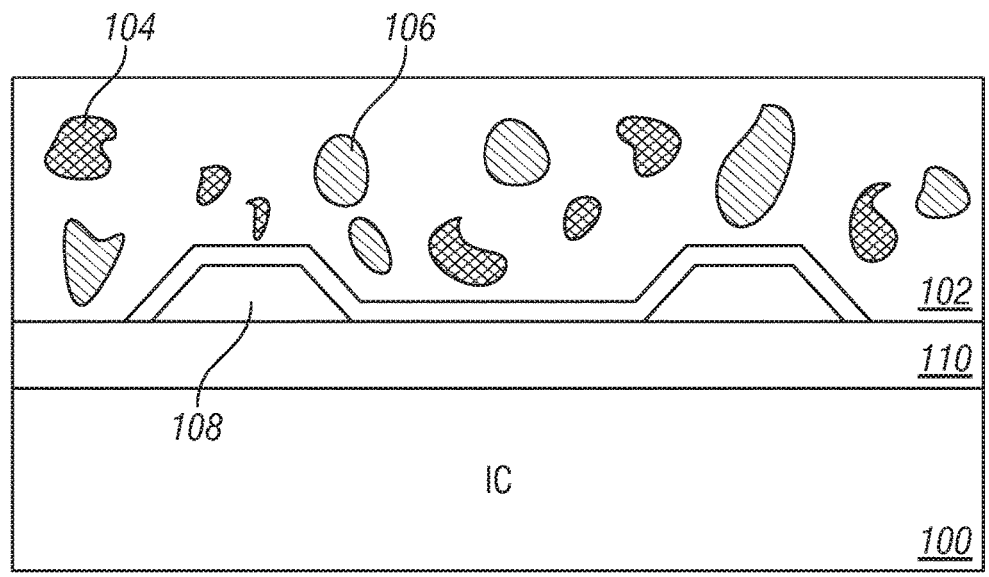
FIG. 1 diagrammatically illustrates a coating PUF arrangement.

Referring now to FIG. 1, a coating PUF arrangement is diagrammatically shown. An integrated circuit (IC) 100 has a coating 102 containing random dielectric particles. In this specific case, two types of dielectric particles 104, 106 with different dielectric constants are present. The dielectric constant, as well as size, shape and placement for each of the particles affect the capacitance.

By measuring several different local capacitance values of the coating a characteristic pattern is achieved. This characteristic pattern may be read out with a matrix of sensor structures 108 comprised in the top metal layer of the IC 100, placed above an insulation layer 110.

Figure 3:
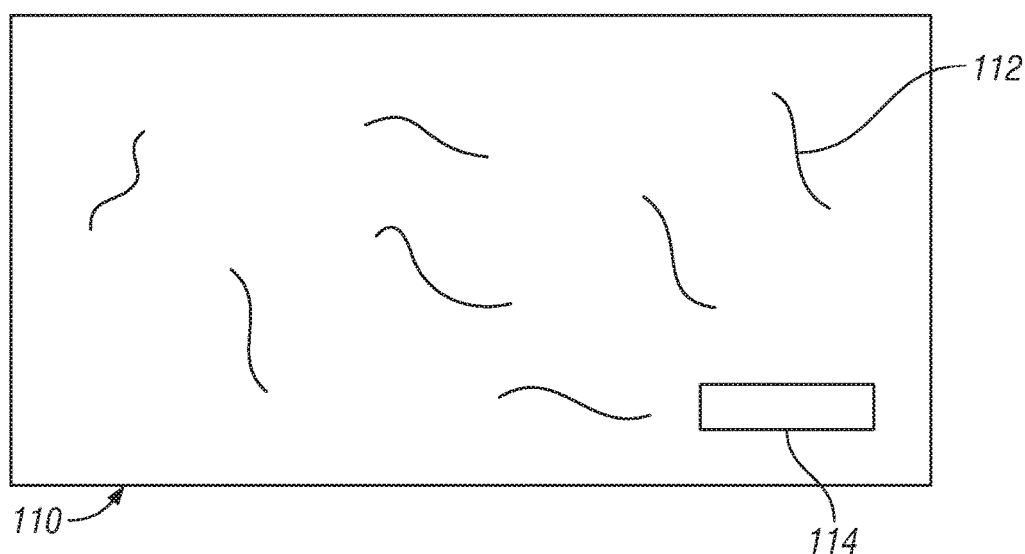
FIG. 3 diagrammatically illustrates a passive, tamper-evident, environmentally-fragile PUF in the form of a label.

Referring to FIG. 3 of the drawings, there is illustrated a tamper evident, environment fragile label. The label 110 includes a random distribution of a plurality of physically detectable particles 112. Preferably, the random distribution is achieved by mixing the particles with the main material elements of which the label is made (e.g. plastic particles or paper fibers) during the production of the label. This will give a random distribution, unique for each label. In this context, a main characteristic of the 'random' distribution is that it cannot be reliably reproduced (i.e. 'uncloneable'), such that each label is uniquely identifiable.

Advantageously, the particles are of a different material (or treated differently, e.g. painted or coated) than the main label particles, not only to enable reliable and simple detection of the particles, but also to ensure that the PUF pattern is damaged in the event that the item to which the label is attached, or in which it is incorporated, is exposed to a predetermined condition.

Other suitable methods of providing a tamper-evident, environmentally fragile PUF are also envisaged and the present invention is not necessarily intended to be limited in this regard.

In any event, the characteristic pattern for a PUF arrangement will be referred to as a "PUF pattern", and the data generated by this PUF pattern will be referred to as a "cryptographic key" or unique identifier.

Radio Frequency Identification (RFID) tags are integrated circuits (IC), which may be used for wireless identification of items. Today, RFID tags are widely used in supply chain management, and in the future the barcode system may be replaced by an RFID arrangement.

Figure 2:
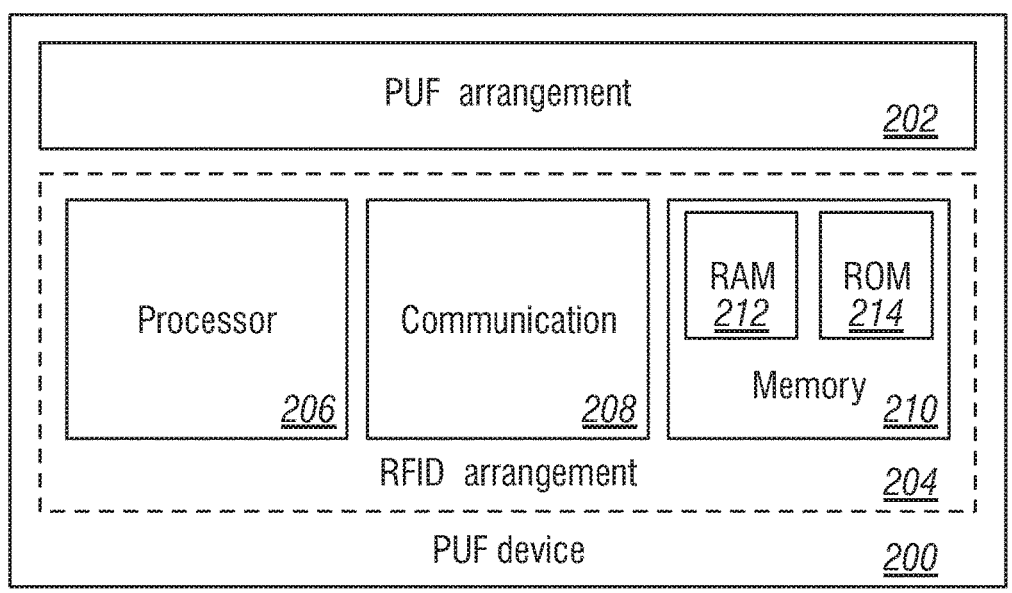
FIG. 2 diagrammatically illustrates a PUF device.

By combining an RFID arrangement with a PUF arrangement, a system for wireless identification and verification of authenticity is achieved. A device to be used in such a system is presented in FIG. 2.

The overall device, herein referred to as a "PUF device" 200, may be in the form of a label in order to be easily attached to items.

The PUF device 200 comprises a PUF arrangement 202, preferably a coating PUF arrangement, and an RFID arrangement 204. The RFID arrangement 204 comprises, in turn, a processor 206, communication means 208 and a memory 210.

The memory 210 may be divided into a volatile memory 212, such as a RAM, and a non-volatile memory 214, such as an EEPROM, or other suitable type of ROM, wherein the volatile memory 212 may be used for temporary storing of a PUF pattern and the non-volatile memory 214 may be used for storing software instructions and data for identification purposes. Alternatively, the enrollment data may be stored on non-volatile memory.

Alternatively, the PUF pattern maybe provided in the form of a completely passive, tamper-evident label or the like.

Figure 4:
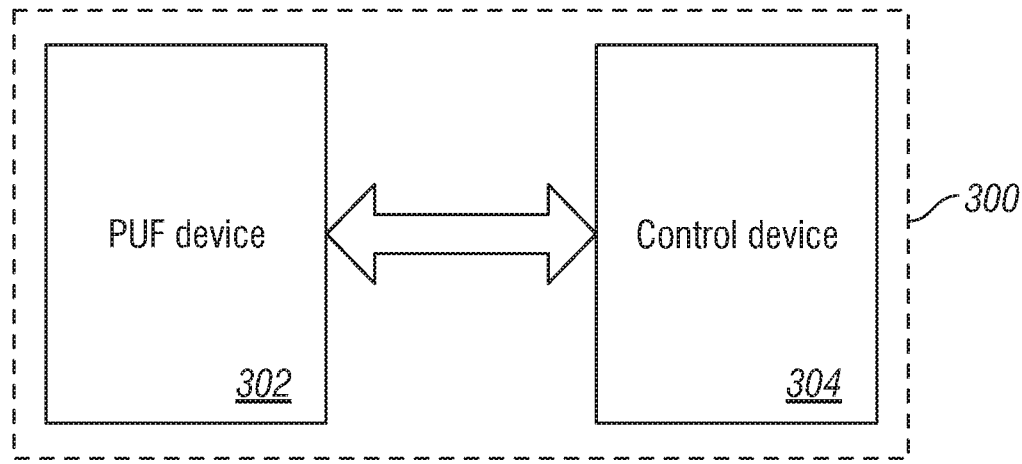
FIG. 4 diagrammatically illustrates a system for off-line verification of authenticity.

Referring to FIG. 4, a system for off-line verification 300 of authenticity is presented. The system comprises a PUF device 302 and a control device 304.

The PUF device 302 may be comprised within a label attached to an item in such a way that when the item is used for the first time the PUF pattern, within the PUF device, is destroyed, for example:
- opening a box
- push-through-strip
- glued milk pack
- PUF-covered electronic component
- PUF-covered screw.

Alternatively, the PUF pattern is damaged, such that the PUF device is no longer able to authenticate the item, but the PUF device can still be used for identification of the item, e.g. in a home environment. Damaging the PUF then gives it a new identity. Either way, if the PUF device has been exposed to the preselected undesirable environmental condition, the PUF pattern will be damaged, and authentication will not be possible.

The control device 304 may be a hand-held device adapted to near field communication (NFC), such as a NFC-enabled mobile phone.

Figure 5:
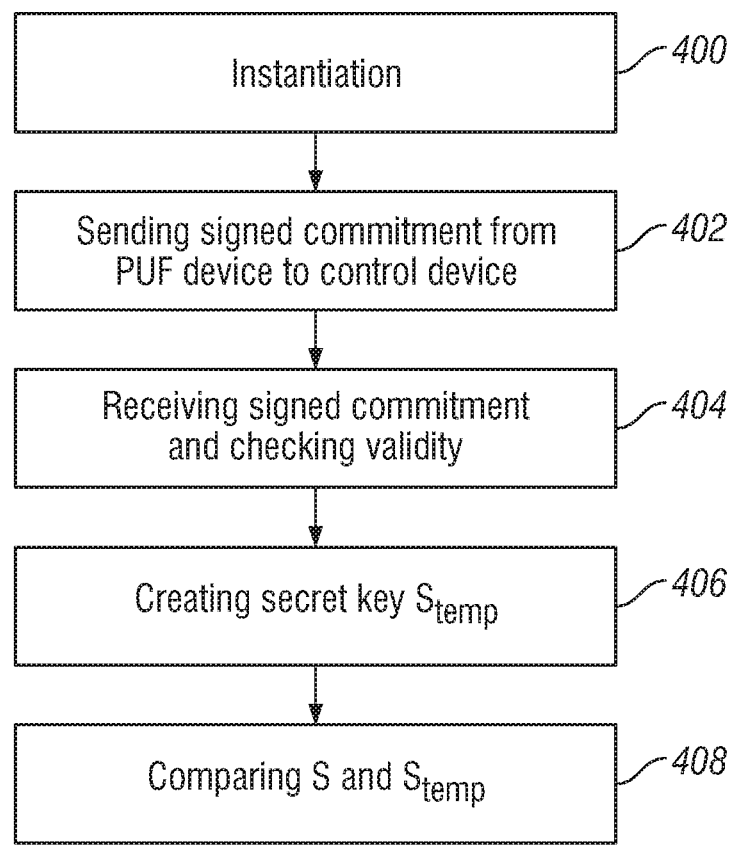
FIG. 5 shows a flow diagram for a method for off-line verification of authenticity.

Now referring to FIG. 5, the method of an off-line verification system is described. However, before an off-line verification may be carried out, the PUF device must be enrolled. In the enrollment phase, a trusted third party with public key e signs a commitment C(S) to the unique identifier S, using its private key d, and stores the signed commitment $\$_d C(S)$ into the PUF device, preferably in the non-volatile memory 214. Note, the pair e,d. is a public/private key pair of which the public key e is publicly known and the private key d is kept secret by the signer. The notation $\$_d$ denotes a signature created with the private key d, which can be verified (by anyone) using public key e.

The signed commitment $\$_d C(S)$ or the commitment C(S) do not reveal any information about the unique identifier S. Furthermore, since the private key d (of the key pair e.d.) has been used, it is possible for anyone to check the signature of the commitment $\$_d C(S)$, using public key e.

Firstly in the off-line verification, in step 400, an instantiation message is sent from the control device to the PUF device. If the PUF device is externally powered, this step also includes powering the PUF device.

Secondly, in step 402, the commitment $\$_d C(S)$ is sent from the PUF device to the control device.

Thirdly, in step 404, the control device receives the commitment $\$_e C(S)$ and verifies that the signature is valid.

Fourthly, in step 406, the PUF device creates a secret cryptographic key $S_{temp}$ using its incorporated PUF pattern and stores this key $S_{temp}$ temporarily in the volatile memory.

Fifthly, in step 408, the PUF device and the control device interacts in order to check if the secret cryptographic key S, used in the commitment $\$_e C(S)$, corresponds to the temporarily stored secret key $S_{temp}$. In order not to reveal any secret information, such as the temporarily stored secret key $S_{temp}$, a zero-knowledge (ZK) protocol is utilized for communication between the PUF device and the control device. Below, ZK protocol will be described in more detail.

If $S_{temp}$ and S turn out to be the same, the PUF device has not been changed since the enrollment, which implies that the item is authentic, and that it has not been exposed to an undesirable environmental condition (i.e. the re-sale conditions in respect of the item are met).

However, for instance, if someone has opened or used the item in such a way that the label which comprises the PUF device, especially the PUF pattern, has been damaged, this will be detected due to the fact that $S_{temp}$ will not be the same as S. Similarly, if the re-sale conditions are not met, this will be detected because $S_{temp}$ will not be the same as S.

The basic idea with a ZK protocol is to prove the possession of a secret without revealing it. In this case the secret key S, used in order to get the commitment $\$_d C(S)$, and the temporarily stored secret key $S_{temp}$ should be proven to be equal without revealing any of them.

The signed commitment $\$_d C(S)$ is preferably stored in the memory of the RFID device containing the PUF. In order to securely link the RFID device with a certain physical object or item, an additional signature $\$'(\$_d C(S), ItemText)$ on both the signed commitment and a value 'ItemText' is preferably stored in the RFID device as well. Here ItemText denotes a certain characteristic of the item like text on the item, serial number, barcode type of product, expiry date etc. The second signature $\$'$ is created using public key cryptography by the party that embeds the RFID. The reader device could check whether this second signature $\$'$ is valid and whether the ItemText matches with the scanned item before starting the ZK protocol. Alternatively the ItemText could be displayed on the reader device such that the user can check that the scanned RFID tag with PUF is the correct tag that matches with the item that he is scanning.

One possible ZK protocol is Schnorr's identification protocol. In brief, Schnorr's identification protocol goes as follows: three public numbers, denoted p, q and g are chosen where p is a 1024 bit prime number, q is 160 bit prime number and g is a generator of multipliable order of q, and determine the commitment to S by $C(S)=g^S \mod p$, where S may be assumed to be a number between 0 and q.

Thereafter, a random number r, fulfilling $1 \leq r \leq q-1$, may be generated by the PUF device, and, next, a corresponding public value x, according to $x=g^r \mod p$, may be determined.

After that, the control device generates a random challenge e for which the PUF device generates a response y, according to $y=S*e+r \mod q$.

This response is sent back to the control device who can then check that the response is correct with regard to the values x, e and the commitment C(S) that was signed by the trusted third party, according to $$g^y = x*(C(S))^e \mod p.$$

In terms of ZK protocols, the PUF device has the role of the prover, the control device has the role of the verifier and S functions as the witness.

In the case of a completely passive PUF, e.g. a tamper-evident label with embedded physical structure (e.g. that illustrated in FIG. 2), an off-line verification method may also be used.

In this case, a digital representation of the PUF measurement is stored during an enrolment phase, on the item itself together with information about the item). As before, the digital representation may be signed or encrypted. In any event, it is stored in a suitable form to enable verification by a verification device.

The verification device reads the enrolment data from the label and checks the authenticity thereof.

A measurement unit determines, in respect of a label in or on an item, a digital representation (hereinafter referred to as 'measured representation') based on measurements of physical properties of the particles. The measured properties include information on an actual distribution of at least some of the particles and are measured.

The verification device also includes a comparison unit for comparing the measured representation with the stored representation. The product is only accepted as authentic and has not been exposed to an undesirable environmental condition (i.e. the re-sale conditions in respect of item are met) if these two representations match. If OK, the product is accepted; otherwise, it is rejected. The user is notified of the outcome.

Instead of using an off-line verification system, an on-line verification system may be used.

Figure 6:
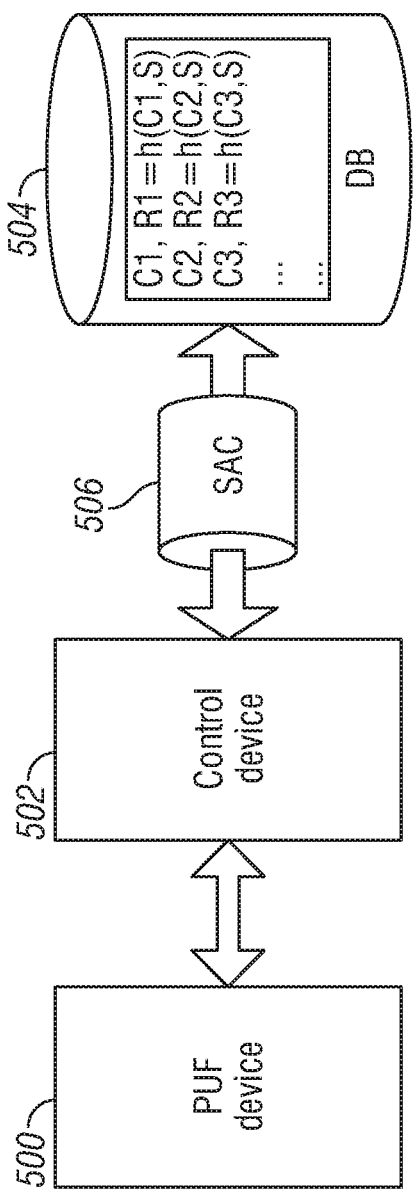
FIG. 6 diagrammatically illustrates a system for on-line verification of authenticity.

Referring to FIG. 6, an on-line verification system comprising a PUF device 500, a verification device 502 and a database 504 is shown. The database may be held on a trusted external server.

The control device 502 may communicate with the database (DB) 504 via a Secure Authenticated Channel (SAC) 506.

The DB 504 may contain a number of pairs of challenges $C_i$ and responses $R_i$, wherein the response $R_i$ may be determined by using a cryptographic one-way hash function h( ) taking the challenge $C_i$ and the secret key S as input parameter, according to $R_i=h(C_i,S)$. Optionally, the data in the DB 504 is signed by the enrolment authority.

Figure 7:
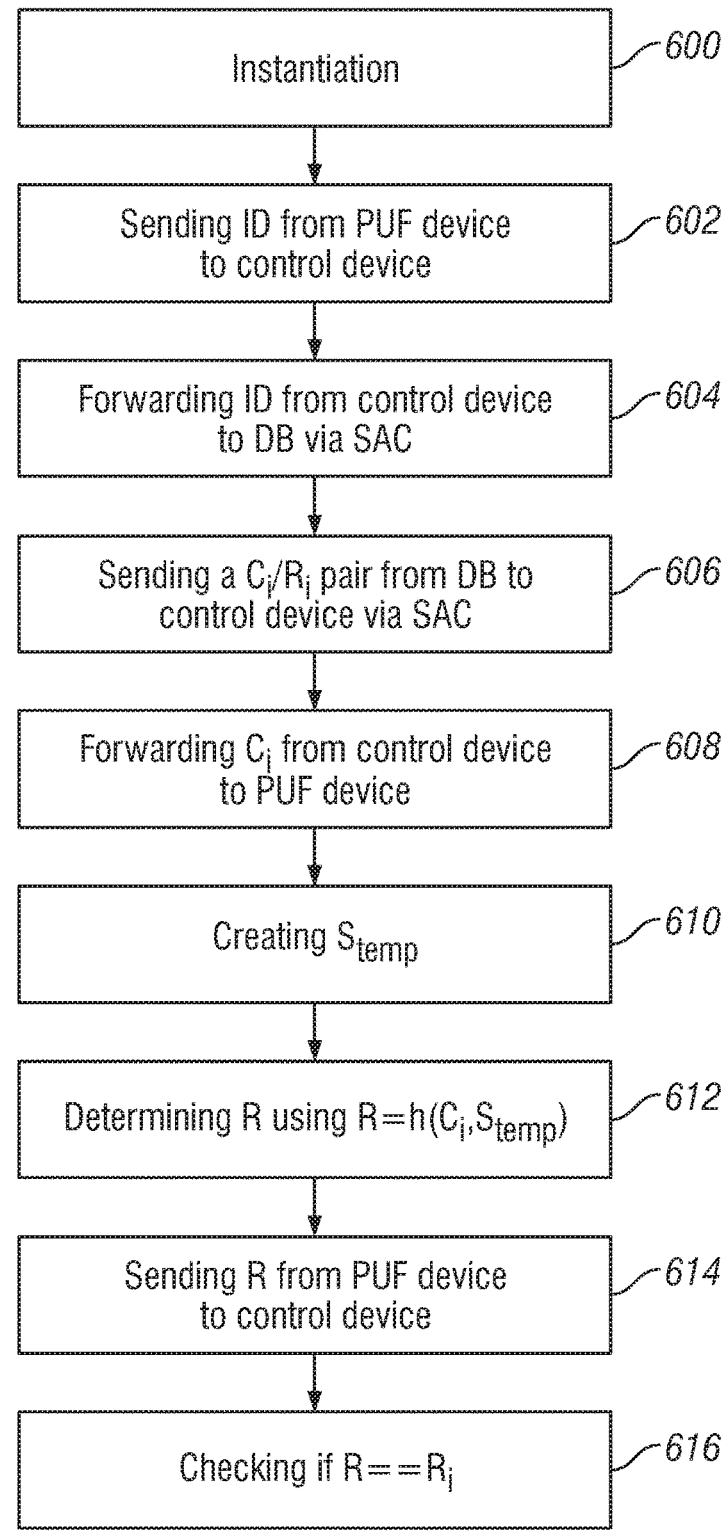
FIG. 7 shows a flow diagram for a method for on-line verification of authenticity.

Now referring to FIG. 7, the method of an on-line verification system is described.

Firstly, in step 600, an instantiation message is sent from the control device to the PUF device. If the PUF device is externally powered, this step also includes powering the PUF device.

Secondly, in step 602, the PUF device sends an ID to the control device.

Thirdly, in step 604, the control device receives the ID and forwards this ID via the SAC to the DB.

Fourthly, in step 606, the database receives the ID and finds an unused $C_i/R_i$ pair and sends this back to the control device. Alternatively, a new $C_i/R_i$ pair is generated and sent back to the control device. Another alternative is that the DB sends the complete list of enrolled challenge-response pairs to the control device.

Fifthly, in step 608, the control device receives the $C_i/R_i$ pair and forwards the challenge $C_i$ to the PUF device.

Sixthly, in step 610, the PUF device receives the $C_i$. Thereafter, the PUF device creates S using the PUF pattern and stores this S in the volatile memory. If a coating PUF arrangement is used the S is created by measuring the local capacitance values of the coating.

Seventhly, in step 612, the PUF device reconstructs a response R by using the previously mentioned cryptographic one-way hash-function, $R=h(C_i,S)$.

Eighthly, in step 614, the PUF device sends the reconstructed response R to the control device.

Ninthly, in step 616, the control device receives the reconstructed response R and checks whether this reconstructed response equals the response $R_i$. If the responses are equal, the PUF pattern is considered being unchanged, which implies that the item is authentic, and the re-sale conditions are met.

It will be appreciated that the number of challenge-response pairs could, in fact, be 1. In this case, one single physical property is measured (but the response is not necessarily secret) and the authenticity of the enrolment data is checked by the verifier. Unclonability guarantees that nobody can make a fake.

Again, in the case of a completely passive, tamper-evident, environmentally fragile PUF, an on-line verification system could be used.

In this case, a verification device measures an ID in respect of the PUF and forwards this ID via the SAC to the DB. Next, the database receives the ID and finds an unused $C_i/R_i$ pair and sends this back to the verification device. Alternatively, a new $C_i/R_i$ pair is generated and sent back to the verification device. Another alternative is that the DB sends the complete list of enrolled challenge-response pairs to the verification device.

Next, the control device receives the $C_i/R_i$ pair and applies the challenge $C_i$ to the PUF and creates S using the PUF pattern and stores this S in the volatile memory. If a coating PUF arrangement is used the S is created by measuring the local capacitance values of the coating.

The verification device then reconstructs a response R by using the previously mentioned cryptographic one-way hash-function, $R=h(C_i,S)$ and checks whether this reconstructed response equals the response $R_i$. If the responses are equal, the PUF pattern is considered being unchanged, which implies that the item is authentic, and the re-sale conditions are met.

It will be appreciated that the number of challenge-response pairs could, in fact, be 1. In this case, one single physical property is measured (but the response is not necessarily secret) and the authenticity of the enrolment data is checked by the verifier. Unclonability guarantees that nobody can make a fake.

It should be noted that the above-mentioned embodiments illustrate rather than limit the invention, and that those skilled in the art will be capable of designing many alternative embodiments without departing from the scope of the invention as defined by the appended claims. In the claims, any reference signs placed in parentheses shall not be construed as limiting the claims. The word "comprising" and "comprises", and the like, does not exclude the presence of elements or steps other than those listed in any claim or the specification as a whole. The singular reference of an element does not exclude the plural reference of such elements and vice-versa. The invention may be implemented by means of hardware comprising several distinct elements, and by means of a suitably programmed computer. In a device claim enumerating several means, several of these means may be embodied by one and the same item of hardware. The mere fact that certain measures are recited in mutually different dependent claims does not indicate that a combination of these measures cannot be used to advantage.

The invention claimed is:

1. A physical uncloneable function (PUF) device, comprising:
   an RFID arrangement comprising:
      a processor,
      communication means,
      a memory, and
   a PUF arrangement comprising:
      an environmentally fragile label including a random distribution of a plurality of physically detectable particles, wherein the random distribution is achieved by mixing pre-selected physically detectable particles with main material elements of which the label is made during the production of the label to form a characteristic PUF pattern,
   wherein said characteristic PUF pattern is unique for each label, such that it cannot be reliably reproduced and is therefore uniquely verifiable,
   wherein said PUF pattern is configured to verify a physical condition of said item to which said PUF device is formed in or attached to,
   wherein said physically detectable particles are pre-selected such that said PUF pattern is arranged to be damaged in the event that said item to which said PUF device is formed in or attached to is exposed to a preselected undesirable environmental influence that is known to cause a measurable change in said physically detectable particles based on physical properties of the particles, wherein said damage does not result from human physical contact with the PUF device, and wherein said preselected undesirable environmental influence comprises one of a chemical environmental influence, a biochemical environmental influence, a moisture environmental influence, a light environmental influence, an electromagnetic environmental influence, and a pressure environmental influence.

2. A PUF device according to claim 1, wherein said PUF pattern is arranged to be damaged when using said item for the first time.

3. A PUF device according to claim 1, wherein said PUF pattern is formed in or on a label.

4. A PUF device according to claim 1, wherein said PUF pattern is provided in or on a passive or active sensor.

5. A PUF device according to claim 4, wherein said sensor comprises a radioactivity sensor, an accelerometer, shock or vibration sensor, a chemical or biochemical sensor, a moisture sensor, a light sensor, an electromagnetic field sensor, or a pressure sensor.

6. A PUF device according to claim 1, wherein said PUF pattern is formed in or on a light or moisture sensitive material.

7. A system for verifying a physical condition of an item to which a physical uncloneable function (PUF) device is formed in or attached to, the system comprising:

A PUF device comprising:
an RFID arrangement further comprising:
a processor,
communication means,
a memory, and
a PUF arrangement comprising:
an environmentally fragile label including a random distribution of a plurality of physically detectable particles, wherein the random distribution is achieved by mixing pre-selected physically detectable particles with main material elements of which the label is made during the production of the label to form a characteristic PUF pattern,
wherein said characteristic PUF pattern is unique for each label, such that it cannot be reliably reproduced and is therefore uniquely verifiable,
wherein said PUF pattern is configured to verify a physical condition of said item to which said PUF device is formed in or attached to,
wherein said physically detectable particles are pre-selected such that said PUF pattern is arranged to be damaged in the event that said item to which said PUF device is formed in or attached to is exposed to a preselected undesirable environmental influence that is known to cause a measurable change in said physically detectable particles based on physical properties of the particles,
wherein said damage does not result from human physical contact with the PUF device,
wherein said preselected undesirable environmental influence comprises one of a chemical environmental influence, a biochemical environmental influence, a moisture environmental influence, a light environmental influence, an electromagnetic environmental influence, and a pressure environmental influence,
a verification device for verifying a physical condition of an item to which the PUF device is formed in or attached to, the verification device comprising:

a) a measurement unit for obtaining a measured response from a PUF pattern,
b) a comparison unit for comparing said measured response with a stored response in respect of said PUF, and
wherein the verification device determines whether said PUF pattern has been exposed to said predetermined undesirable environmental influence based on said comparison.

8. A system according to claim 7, wherein the verification device verifies the authenticity of enrollment data stored in a memory of said PUF during an enrolment phase.

9. A method of enabling verification of a physical condition of an item including a PUF device attached to or integrated within said item, the method comprising:

obtaining, by a control device, a measured response from a PUF pattern of said item, wherein said PUF pattern is comprised of one or more pre-selected materials and is arranged to be damaged in the event said item is exposed to a pre-selected undesirable environmental influence, wherein said PUF pattern is a characteristic pattern that is formed in or on an environmentally fragile label, the label including a random distribution of a plurality of physically detectable particles, wherein the random distribution is achieved by mixing pre-selected physically detectable particles with main material elements of which the label is made during the production of the label to form said characteristic PUF pattern, wherein said characteristic PUF pattern is unique for each label, such that it cannot be reliably reproduced and is therefore uniquely verifiable, wherein said PUF pattern is configured to verify a physical condition of said item to which said PUF device is formed in or attached to, wherein said physically detectable particles are pre-selected such that said PUF pattern is arranged to be damaged in the event that said item to which said PUF device is formed in or attached to is exposed to the pre-selected undesirable environmental influence that is known to cause a measurable change in said physically detectable particles based on physical properties of the particles, wherein said damage does not result from human physical contact with the PUF device, forming authentication data based on information derived from the measured response from said PUF pattern, wherein formation of said authentication data comprises:
signing a commitment C(S) by a trusted third party with a public key to a unique identifier S, and
using a private key by the trusted third party, and
storing the signed commitment as authentication data into a memory of the PUF device, checking, by the control device, the authenticity of the stored authentication data by asserting one or more challenge response pairs to measure a single property of the item, comprising:
generating, by the control device, at least one random challenge for which the PUF device generates at least one response,
sending, by the PUF device, the response back to the control device,
checking, by the control device, whether the response is correct and whether the commitment was signed by the trusted third party, and accepting the item as authentic as not having been exposed to a preselected undesirable environmental influence if the asserted one or more challenge-response pairs are satisfied.

10. A method according to claim 9, further comprising signing said authentication data prior to storage thereof.

11. A method according to claim 9, wherein the step of forming said authentication data comprises a sub-step of generating a first helper data for use during verification of a physical condition of an item.

12. A PUF device according to claim 1, wherein said PUF pattern is arranged to degrade over time.

13. A system according to claim 7, wherein said PUF pattern is arranged to degrade over time.

14. A method according to claim 9, wherein said PUF pattern is arranged to degrade over time.

\* \* \* \* \*